J. S. WILLIAMS.
WRENCH.
APPLICATION FILED FEB. 14, 1919.
1,317,846.
Patented Oct. 7, 1919.
2 SHEETS—SHEET 1.
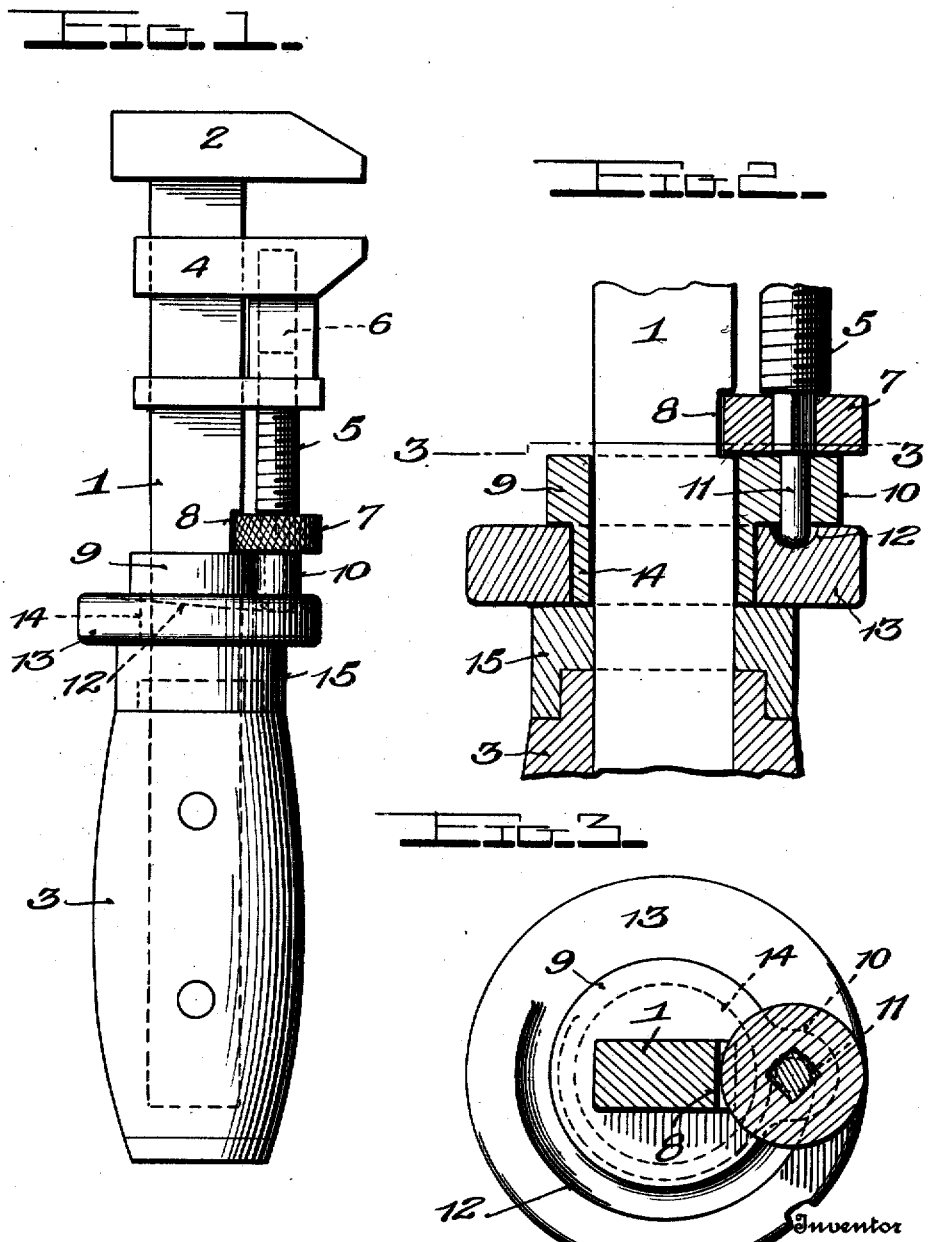
Inventor
Jarvis S. Williams.
Attorney J. S. WILLIAMS.
WRENCH.
APPLICATION FILED FEB. 14, 1919.
1,317,846.
Patented Oct. 7, 1919.
2 SHEETS—SHEET 2.
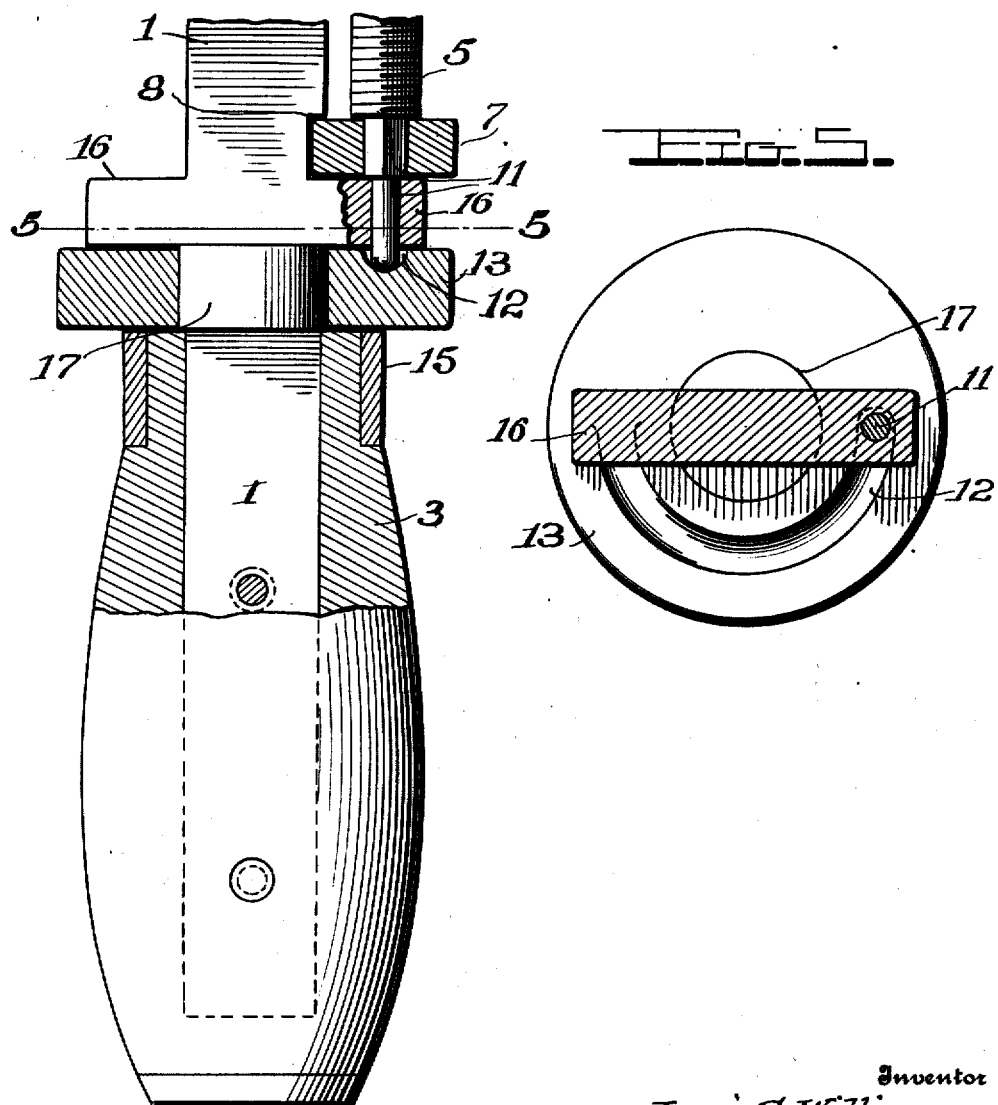
Inventor
Jarvis S. Williams
By
Attorney

UNITED STATES PATENT OFFICE.

JARVIS S. WILLIAMS, OF DANBURY, CONNECTICUT.

WRENCH.

1,317,846.   Specification of Letters Patent.   Patented Oct. 7, 1919.

Application filed February 14, 1919. Serial No. 276,892.

*To all whom it may concern:*

Be it known that I, JARVIS S. WILLIAMS, a citizen of the United States, residing at the city of Danbury, in the county of Fairfield and State of Connecticut, have invented certain new and useful Improvements in Wrenches; and I do declare the following to be a full, clear, and exact description of the invention, such as will enable others skilled in the art to which it appertains to make and use the same.

This invention relates to certain new and useful improvements in a wrench and especially to that type which embodies a cam adjustment for supplementing the main screw adjustment.

The principal object is to improve the construction and mounting of the supplemental adjusting means to facilitate the final setting of the jaws against a nut in an efficient manner.

Further, the invention resides in the features of construction and the combination of parts hereinafter described in detail and claimed succinctly, reference being had to the accompanying drawing wherein—

Figure 1 is a side elevation of the preferred form of improved wrench;

Fig. 2 is a fragmental longitudinal section thereof through the supplemental adjustment;

Fig. 3 is a transverse section on the line 3—3 of Fig. 2, further illustrating the construction;

Fig. 4 a view similar to Fig. 2, but showing a modification of the invention; and Fig. 5 a section at line 5—5 of Fig. 4.

Referring more in detail to the drawing, the shank 1 has a fixed jaw 2 on one end and a fixed handle 3 on its opposite end, a movable jaw 4 being slidably connected to the shank for adjustment toward and from the fixed jaw by means of the screw 5 which has threaded engagement in a bore or opening 6 in said slidable jaw. A knurled nut 7 is secured on the inner end of the screw stem against relative rotation and has its periphery entered in a recess 8 of shank 1, which recess is of sufficient length to permit limited bodily movement of the nut 7 along with the screw 5.

A collar 9 embraces the shank adjacent the recess 8 and is provided with a lateral bearing projection 10, which underlies and supports the nut 7. This projection is perforated to receive and journal a reduced pin extension 11 of screw 5 that protrudes through said journal bearing and is rounded at its end for riding in an arcuate cam groove 12 of cam disk 13. The collar 9 is also formed with a depending cylindrical hub 14 about which the cam disk 13 rotates, said hub seating on the ferrule 15 of handle 3. The top and bottom faces of the disk are parallel and have bearing support on the ferrule and also the underside of the collar.

At Figs. 4 and 5 is shown a modification in which, instead of the separate collar 9 with its projecting hub 14, the shank 1 is formed with lateral projections 16 while such shank adjacent the rear of said projections is round as shown at 17, the cam disk 13 being journaled on such round portion, while the pin 11 extends through the part 16.

This modified construction is substantially like that shown at Fig. 2, since in both instances the parts 9 and 16 and the hub 14 and round portion 17 are rigid with the shank 1.

In operation, the jaws are adjusted to embrace a nut in the usual manner by rotating the knurled nut 7 which turns the screw in the threaded opening 6 and thus advances the movable jaw against one face of the nut to be manipulated. A final and tight grip on the nut is now effected by supplementing the screw adjustment with a partial rotation of the cam disk which causes the cam groove to ride beneath the end of the pin extension 11 and force it upwardly, thereby setting the jaw 4 immovable against the work.

In wrenches embodying the screw adjustment alone, subsequent to the setting of the slidable jaw by the knurled nut on the screw, there is more or less back lash or lost motion on the part of the movable jaw because it is not only impossible to firmly set the jaw against the work by the manipulation of the knurled nut with the fingers, but also when the wrench is operated the force against the jaw will set the latter back slightly because the inclined threads of the screw will work against the nut on the principle of a sliding wedge.

This loosening of the jaw on its work is obviated by the supplemental cam adjustment which firmly sets the jaw against the work and holds it immovable. The release of the jaw is readily effected by turning the cam disk in the reverse direction which operation is very simple and relieves the knurled nut from back pressure. Furthermore, the pitch of the screw threads may be made steep to expedite the initial adjusting step since the back lash which would ordinarily occur is readily taken up by the final cam adjustment. It is to be noted that the cam disk is worked by the fingers and thumb similarly to the knurled nut and because of the relatively superposed relation of the nut and disk the fingers may quickly be moved from one member to the other. There are no projecting levers from the cam member to interfere with the manipulation of the wrench, and by reason of the cam groove the outer edge will constitute a guard for the pin extension 11.

What is claimed is:

1. A wrench comprising a shank having a fixed jaw, a slidable jaw on the shank having a threaded opening therein, a screw engaged in the slidable jaw opening, a nut secured on the screw and entered in a recess in the shank, a handle on the shank, a ferrule on the handle, a perforated projecting element immovable on the shank and adjacent the recess, a cylindrical portion likewise immovable on the shank and in the rear of said projecting element, a reduced pin extension from the screw projecting through the perforation in said element, and a disk journaled on said cylindrical portion and formed with a cam surface with which said pin extension contacts.

2. A wrench comprising a shank having a fixed jaw, a slidable jaw on the shank having a threaded opening therein, a screw engaged in the slidable jaw opening and having a reduced pin extension, a nut secured on the screw and entered in a recess in the shank, a handle on the shank, a ferrule on the handle, a collar on the shank adjacent the recess and provided with a cylindrical hub seating on the ferrule, said collar having a perforation through which said reduced pin extension from the screw projects, and a cam disk rotatable on the hub and formed with a concentric cam groove in which the pin extension operates.

In testimony whereof I affix my signature in presence of two witnesses.

JARVIS S. WILLIAMS.

Witnesses:
 THOS. S. WHITE,
 W. B. BULL.

Copies of this patent may be obtained for five cents each, by addressing the "Commissioner of Patents, Washington, D. C."